T. Nutting.
Fruit Picker.

No. 91,256.      Patented Jan. 15, 1869.

Witnesses:
S. N. Piper
J. R. Snow

Inventor:
T. Nutting.
by his attorney
R. H. Eddy

United States Patent Office.

THOMAS NUTTING, OF GEORGIAVILLE, RHODE ISLAND.

Letters Patent No. 91,256, dated June 15, 1869.

IMPROVEMENT IN FRUIT-PICKER.

The Schedule referred to in these Letters Patent and making part of the same.

*To all persons to whom these presents may come:*

Be it known that I, THOMAS NUTTING, of Georgiaville, of the county of Providence, and State of Rhode Island, have invented an Improved Fruit-Picker; and do hereby declare the same to be fully described in the following specification, and represented in the accompanying drawings, of which—

Figure 1:
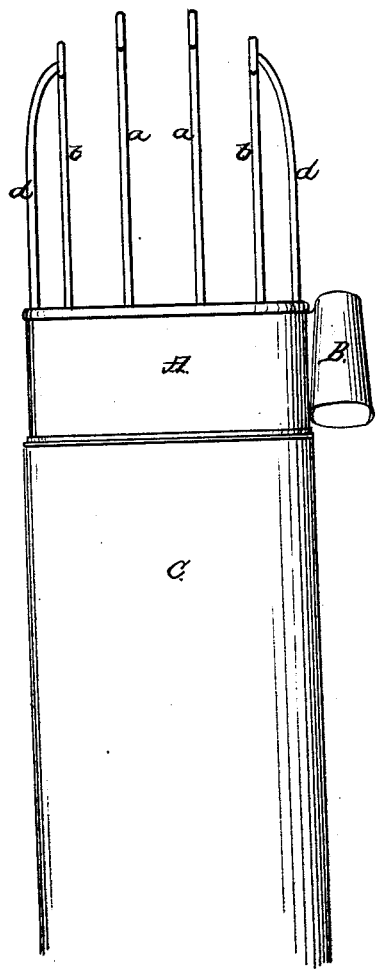
Figure 2:
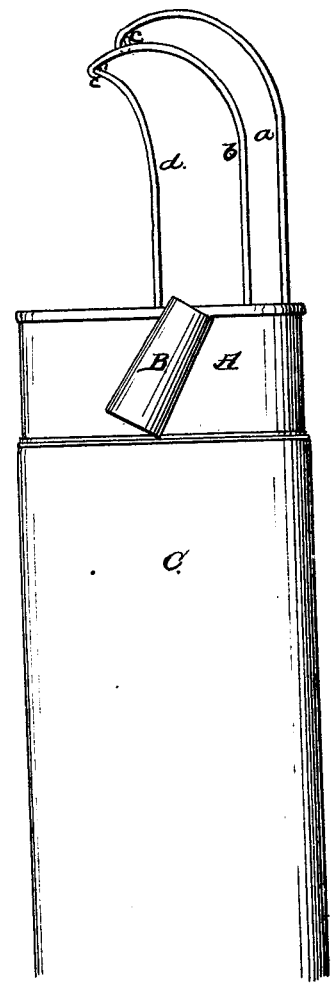

Figure 1 is a front elevation, and
Figure 2, a side view of it.

In such drawings—

A denotes an annular or short cylindrical tube, having fixed to one side of it a pole-socket, or frusta-conical tube, B, which is arranged obliquely thereon, in manner as shown.

The tube A is flanged, both at top and bottom, and at the latter is fixed, or to be fixed when in use, to one end of a long cloth tube, or conductor, C.

There project upward from the tube A four hooked wires, $a\ a$ and $b\ b$, each of which, at its upper end, is bent around in the form of an eye, as shown at $c$.

The two external wires, $b\ b$, are inserted, at their upper ends, to other or brace-wires, $d\ d$, which, curved in manner as shown, extend upward from the tube A, and at about one hundred and eighty degrees distant from one another, the remaining wires being disposed at or about equal distances asunder, and between the two brace-wires.

The said two brace-wires not only serve to support the upper parts of the wires $b\ b$, and to prevent such wires from springing backward, but, with them, constitute guides to direct a fruit to the grasping or elastic hooked arms $a\ a$, after its detachment from the tree. The said guides also direct the fruit into the annulus A, so that it may pass into and down the conductor attached thereto.

The hooked wires $a\ a$, by being disconnected at top with each cther and anything else, are free to spring back and forth, and readily adapt themselves to a fruit, so as not to bruise it while used in detaching it from a tree.

To use the fruit-picker, it is to be passed up underneath and back of a fruit when hanging from a tree. The hooks should next be brought over the fruit so that its stem may come between them. The picker is next to be drawn forward, when the fruit will be detached, and will be guided into the ring A.

I am aware that fruit-pickers have been made with claws projecting from a basket, or pouch, and therefore make no claim to such.

I am also aware of the fruit-picker as described in the United States patent, No. 61,257, and therefore do not claim such.

My fruit-picker is simpler in construction, and better in many respects, as my arrangement of brace-wires $d\ d$ with the outer hooked wires $b\ b$, causes them to mutually support each other under the strains brought on them by the fruit while being plucked from the tree.

What, therefore, I claim as my invention, is—

The improved fruit-picker, as made, with the brace-wires $d\ d$, connected, at their upper ends, with the lateral hooked wires $b\ b$, and arranged and combined with the annulus A and the remaining hooked wires, in manner substantially as described.

THOMAS NUTTING.

Witnesses:
R. H. EDDY,
SAMUEL N. PIPER.